United States Patent [19]
Wyche et al.

[11] Patent Number: 5,244,721
[45] Date of Patent: Sep. 14, 1993

[54] STATIC DISSIPATIVE LAMINATE CONTAINING STAINLESS STEEL FIBERS

[75] Inventors: Christine C. Wyche, Randallstown; Robin O'Dell, Pasadena; Israel S. Ungar, Randallstown, all of Md.

[73] Assignee: Nevamar Corporation, Odenton, Md.

[21] Appl. No.: 882,397

[22] Filed: May 13, 1992

Related U.S. Application Data

[63] Continuation-in-part of Ser. No. 624,442, Dec. 10, 1990, abandoned.

[51] Int. Cl.$^5$ .......................... D04H 1/16; B31D 1/00; B32B 5/08
[52] U.S. Cl. ...................................... 428/282; 162/123; 162/125; 162/129; 162/132; 162/138; 162/141; 162/188; 428/280; 428/284; 428/285; 428/286; 428/288; 428/289; 428/290; 428/297; 428/298; 428/302; 428/464; 428/511; 428/537.5; 428/913.3
[58] Field of Search ............... 428/285, 286, 284, 280, 428/282, 297, 408, 288, 289, 290, 298, 302, 511, 537.5, 913.3, 464; 162/123, 125, 129, 132, 138, 141, 188

[56] References Cited

U.S. PATENT DOCUMENTS

| | | | |
|---|---|---|---|
| 4,540,624 | 9/1985 | Cannady, Jr. | 428/285 |
| 4,724,187 | 2/1988 | Ungar et al. | 428/408 |
| 4,784,908 | 11/1988 | Ungar et al. | 428/408 |
| 4,891,264 | 1/1990 | Daimon et al. | 428/286 |

Primary Examiner—George F. Lesmes
Assistant Examiner—James D. Withers
Attorney, Agent, or Firm—Browdy and Neimark

[57] ABSTRACT

A decorative static dissipative high pressure laminate having a plurality of consolidated thermosetting resin impregnated layers including a core and a decor surface layer to provide a surface resistance no greater than $2 \times 10^9$. The core comprises at least one thermosetting resin impregnated paper core sheet and at least one special thermosetting resin impregnated core sheet of predominately paper fibers and a small quantity of stainless steel fibers irregularly distributed among the paper fibers.

8 Claims, 1 Drawing Sheet

STATIC DISSIPATIVE LAMINATE CONTAINING STAINLESS STEEL FIBERS

This is a CIP of parent application Ser. No. 07/624,442, filed Dec. 10, 1990, now abandoned, hereby incorporated by reference.

FIELD OF THE INVENTION

The present invention relates to static dissipative laminates especially suitable as work top surfaces for assembly of electronic components. The present invention more particularly relates to static dissipative laminates having a stainless steel fiber-containing layer in its core.

BACKGROUND OF THE INVENTION

Continuing interest exists for static dissipative and electrically conductive laminates for use in various environments, including static dissipative work surfaces and conductive flooring materials. Among the prior patents of interest are the U.S. Pat. Nos. to Economy et al 3,567,689; Meiser 3,650,821; Wilks et al 3,922,383; Cannady 4,540,624; Berbeco 4,454,199 and 4,455,350; Grosheim et al 4,472,474; Cannady et al 4,480,001; and Ungar et al 4,784,908 and 4,724,187. Of particular interest are the patents directed to the use of carbon black filled paper, noting the patents of Economy et al, Meiser, and Ungar et al.

The difference between the static electrical properties of static dissipative and conductive material is measured by the surface resistivity (in ohms/square). The Department of Defense defines the electrical properties as follows:
Anti-static : greater than $10^9$
Static dissipative: between $10^6$ and $10^9$
Conductive : less than $10^6$.

A static dissipative environment having a resistivity on the order of about $10^6$ to $10^9$ ohms/square is needed for a work surface for the assembly and repair of electronic components. Electronic components often pick up charges in dry air. When the component is placed on a surface, the charge is discharged, destroying or damaging the component. If the work surface is static dissipative and connected to a ground, the charge will leak off and the damage can be avoided.

Standard high pressure decorative laminates have a surface resistivity of about $10^{11}$ to $10^{13}$ ohms/square. If the work surface resistivity is too high an electrostatic discharge can occur, destroying the electrical components. If the work top resistivity is too low, less than $10^6$ ohms, it becomes a safety hazard for electrical shock as well as a source of damage to electronic components. No particular surface product is suitable for all static dissipative and conductive environments as different usages and different environments require different properties.

Static dissipative laminates prior to that of the Ungar et al U.S. Pat. No. 4,784,908 suffered from other disadvantages in addition to being too conductive or not conductive enough. Some laminates have an upper surface containing conductive particles or fibers for providing a conductive path from the upper surface of the laminate to the interior. This can result in dusting of conductive material from the surface of the laminate as it wears, which can cause electrical short circuits.

Another problem with such conventional static dissipative laminates is that the surface of the laminate tends to lose its electrical conductivity when the relative humidity drops. The resistivity of conventional static dissipative and conductive laminates ca change by several orders of magnitude between 50% and 15% relative humidity.

Some conventional static dissipative laminates also have a problem with field suppression. If the laminate is constructed of a highly conductive layer buried under a relatively non-conducting surface, when the charged object is placed on the surface, a field is induced. When the object is removed, the charge creates the type of static electricity hazard the laminate was supposed to avoid.

Other patents of interest, although these do not relate to high pressure laminates, are the U.S. Pat. Nos. to Rooklyn 4,525,398; O'Brien 4,579,902; Klein 4,590,120; Keough 4,623,594; Nowell et al 4,885,659; and Daimon et al 4,891,264. Of these, the patents to Daimon, Klein, Nowell and Rooklyn are directed to the use of stainless steel or aluminum foil or fibers as electro-conductive elements.

The Rooklyn U.S. Pat. No. 4,525,398 is directed to a conductive laminate product capable of dissipating static charges. The laminate is formed of a thin, hard top layer of plastic material, a thin layer of aluminum foil bonded therebeneath to the top layer and a layer of backing material secured to the metallic foil.

The Daimon U.S. Pat. No. 4,891,264 in essence shows an electroconductive thermoplastic resin sheet. The surface resistivity is in the range of $10^3$ to $10^6$ ohms/square. The surface is comprised of hot-melt-adhesive fibers and electroconductive fibers of diameters of 1–30 $\mu$m which are irregularly entangled with each other and integrally melt-adhere-d into a thermoplastic resin film. The electroconductive fibers used includes metal compounds, carbon fibers, stainless steel fibers, and composite synthetic fibers.

The Klein U.S. Pat. No. 4,590,120 is directed to a rigid or semi-rigid static reducing floor mat. The top layer is comprised of a web of conductive fibers, such as staple fiber materials made from stainless steel or electrostatically metallic coated materials such as Badische's 901 filament or Sauquoit's X-Static which are chemically bonded to the surface in a partially conductive polymeric matrix, these fibers having diameters as small as 0.5 mils (12.8 $\mu$m).

The Nowell U.S. Pat. No. 4,885,659 is directed to a static dissipative mat comprised of a thermoplastic polymer layer and an electrically conductive metallized layer, such as aluminum coated or glass fiber tissue material disposed in the thermoplastic layer. It is required that the tissue material be grounded with a ground wire.

The use of metallic fibers in the prior art has always been, insofar as is known, in non-aqueous environments where surface oxidation phenomena are minimized. Moreover, these prior art uses of metallic fibers have not incorporated the metallic fibers as part of a paper sheet formed by traditional paper making procedures involving the use of aqueous slurries of paper making fibers, e.g. wood pulp. Nor have such prior art uses of metallic fibers subjected such metallic fibers to the extreme temperature and pressure conditions commonly encountered in the manufacture of high pressure decorative laminates, e.g. 230°–340° F. at 800–1600 psi in the presence of an aqueous solution of the laminating resin for a time sufficient to consolidate the laminate and cure the laminating resins, e.g. about 25 minutes.

RELATED APPLICATION

U.S. application Ser. No. 07/624,442 in the names of O'Dell et al, hereby incorporated by reference, solves many of the problems noted above by the use of a core layer of paper containing a small quantity of carbon fibers, and the laminates so produced have excellent properties.

However, there are several disadvantages to using carbon fibers. There are few reliable sources of carbon fibers. Not only are the carbon fibers difficult to manufacture but it is also difficult to achieve an acceptable degree of consistency in the fibers that are produced. Laminate containing more than just a few percent carbon fibers is very stiff and difficult to postform. There are also health and safety problems associated with handling carbon fibers, in that carbon fibers can cause contact dermatitis among the personnel producing the fibers as well as those using the fibers to manufacture the static dissipative laminates.

In addition, carbon fibers are very brittle and degredation of the carbon fibers over time causing carbon fiber breakage is of some concern. As an important use of static dissipative laminate is in so-called "clean rooms", the possibility of generating even a very small amount of carbon particles due to breakage over time of carbon fibers is to be avoided. Also, post-forming laminate containing carbon fibers is problematic because of fiber and laminate breakage.

SUMMARY OF THE INVENTION

It is, accordingly, an object of the invention to overcome deficiencies in the prior art, such as indicated above.

It is another object to provide for the safe and effective dissipation of static electricity from work surfaces, especially work surfaces for the assembly or repair of electronic components, such as in "clean-rooms".

It is a further object of the invention to provide a static dissipative high-pressure decorative laminate which has consistent properties regardless of the relative humidity of the surrounding air.

The laminate according to the present invention preferably has a surface resistance of no more than $10^{11}$ at a relative humidity of 15%. It also preferably has effectively a zero volt charge after 2 seconds at 17% or lower relative humidity.

It is yet another object of the present invention to provide a static dissipative high-pressure decorative laminate which has good abrasion, stain, impact, warp, heat and blister resistance, and light stability.

Still another object is to provide a static dissipative laminate which has controlled and consistent core layer properties regardless of the source or the lot of the conductive material used in the core layer.

It is yet a further object to provide a static dissipative laminate which is safe to manufacture and handle, and which suffers no substantial degradation over time.

These and other objects and advantages of the instant invention will be more apparent from the following detailed description of certain exemplified embodiments taken in conjunction with the accompanying drawing wherein:

BRIEF DESCRIPTION OF THE DRAWING

The sole figure is a schematic perspective view, partly in section, of a laminate in accordance with the present invention.

DETAILED DESCRIPTION OF EMBODIMENTS

Figure 1:
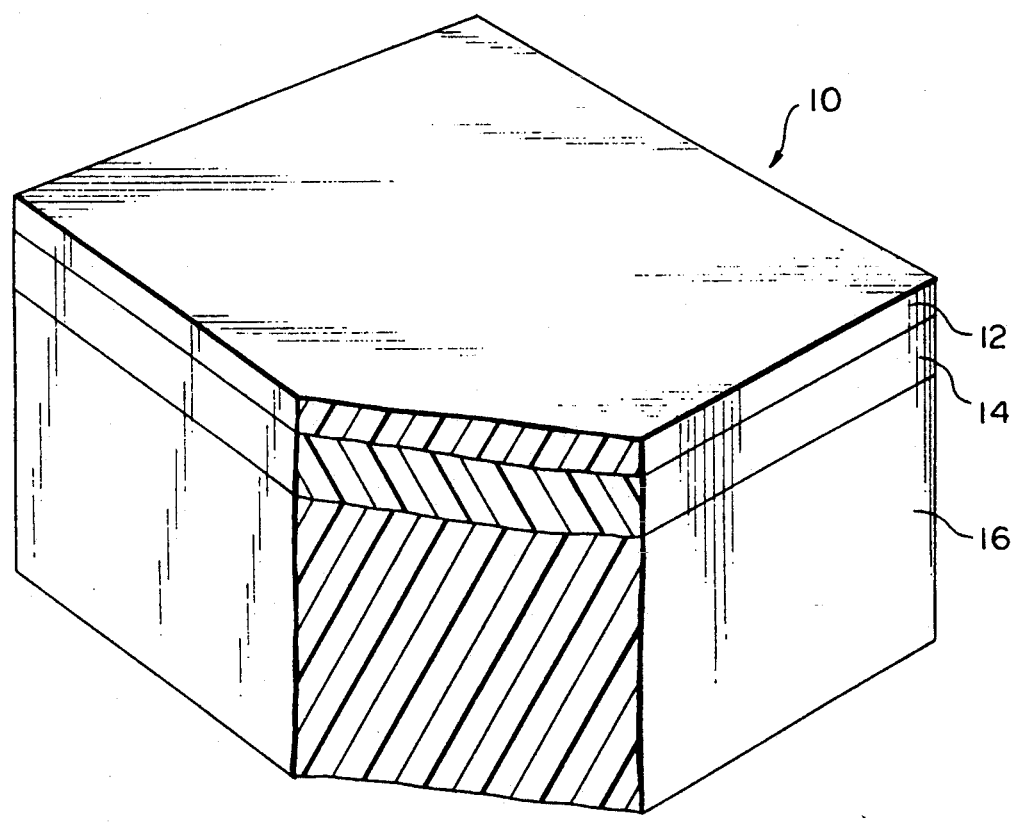

The figure shows a static dissipative high-pressure decorative laminate 10 having an abrasion resistant decor sheet 12 as its upper layer, a special core layer 14 therebeneath, and a plurality of core layers 16 beneath the special top core layer 14. The one or two core layers 14 are conductive by virtue of containing a small quantity of stainless steel fibers as described below.

The decor sheet 12 may be solid colored or may have a design printed on its upper surface in accordance with conventional practice, and is preferably formed of alpha-cellulose paper impregnated with an aqueous solution of melamine-formaldehyde resin in the usual way, although of course other impregnating resins can be used. To give this layer after formation of the laminate the desired abrasion resistance, an ultra-thin abrasion resistant layer is desirably provided consistent with the Scher et al U.S. Pat. No. 4,255,480 and its progeny, or the Ungar et al U.S. Pat. No. 4,713,138. To make the laminate scuff resistant, the ultra-thin coating may be further modified to contain solid lubricant in accordance with O'Dell et al U.S. Pat. No. 4,567,087.

In order to give the present laminate 10 the desired surface resistance which is no higher than $10^9$ even at relative humidities as low as 17.25%, the melamine laminating resin or other impregnating resin is desirably modified by the addition of small amounts of humectant such as glycerin, and an ionic salt such as lithium chloride or sodium formate consistent with the Ungar et al U.S. Pat. No. 4,784,908.

The special core layer or layers 14 each comprises a conductive layer of a special paper sheet which contains stainless steel fibers, described in greater detail below. The metal fibers in the metal-containing sheet(s) provide a short circuit path to rapidly dissipate local charges. Suitable stainless steel fibers which are commercially available from Memtec America Corporation of Deland, Florida, are approximately 8 microns in diameter and available in lengths of ¼, ½ and ¾ inches.

Conventional core sheets make up the plurality of core layers 16. These can be formed of resin impregnated paper in which any kind of paper may be used although the paper sheets desirably comprise unrefined kraft paper or refined kraft paper, as is conventional.

The core layers 14 and 16 are impregnated in the usual way with laminating resin, preferably an aqueous solution of phenolic resin, although again other resins may be used. The assembly of resin impregnated sheets is pressed under heat and pressure using conventional curing cycles to consolidate the sheets and cure the resin, thereby forming the laminate 10.

In on embodiment of the present invention the core of the laminate is comprised of several sheets, only one of which is a sheet 14 of paper made with stainless steel fibers. In another embodiment of the present invention the core conductive layer 14 is comprised of two sheets of paper with stainless steel fibers incorporated therein. As suggested above, the metal fiber-containing core layers are impregnated with a usual laminating resin such as melamine formaldehyde, urea formaldehyde, phenolic resin or the like together with a diluent such as water and/or alcohol. The other sheets are conventional kraft paper or modified kraft paper or mixtures thereof, and the various sheets are also treated with the usual laminating resins, dried, layered and pressed into a static dissipative laminate.

Each metal fiber-containing core conductive sheet is comprised of at least one sheet of paper with 1.5 to 15 % by weight, preferably 3 to 5.5% by weight, based on the total fiber weight, of stainless steel fibers initially coated with water soluble resin such as polyvinyl alcohol or the like. If more stainless steel fibers are present, the cost, weight and stiffness become undesirably greater. The stainless steel fibers desirably have a length of $\frac{1}{4}$ to $\frac{3}{4}$ inches and a diameter of 5-20 μm. If substantially longer, they tend to clump during the paper making process; if substantially shorter, greater quantities are needed increasing the cost, stiffness and weight of the product.

The phenolic resin used to impregnate the core sheets may be either treated by the addition of ionic salt and/or humectant as per Ungar et al '908, or may be used untreated; preferably the phenolic resin used in the special core paper 14 is untreated whereas that used in the regular core paper 16 is treated. The metal fibers comprise only 0.75% to 10% of the total weight of the core layer or layers 14 in the completed laminate 10.

No overlay or any special bottom layer is necessary. The core layers (special layer 14 and regular core layers 16) do not require the presence of humectant or ionic salt. Moving the conductive core layer 14 up to a location directly below the decor layer eliminates the need for any special treatment of the phenolic resin in any other layers, e.g. the use of ionic salt and/or humectant, even though such special treatment as noted above may be desirable for other reasons.

The laminate according to the present invention desirably has an internal resistance less than about $2 \times 10^6$ ohms and a resistance to ground measurement of about $5 \times 10^6$.

Selection of the stainless steel fibers is critical to success. Contrary to what might be expected, not all metallic fibers are suitable. For example, aluminum fibers, brass fibers, common steel fibers and certain stainless steel fibers, e.g. stainless steel 410 and 430, are unsuitable, as these fibers are not sufficiently resistant to corrosion to remain conductive after processing. On the other hand, steel alloys containing on the order of 10% or more of Ni are suitable, e.g. most of the 300 series stainless steels are suitable, stainless steel 316 having been found to be fully adequate. The term "stainless steel" is intended to encompass all such suitable stainless steel alloys including the so-called "nickel-base superalloys" and "iron-nickel-base superalloys". Metallic fibers can be routinely tested, it being understood that such fibers must be sufficiently resistant to corrosion to remain conductive after having been subjected to paper making from an aqueous slurry and after lamination in the presence of aqueous thermosetting resin at a temperature of at least 230° F. and a pressure of at least 800 psi.

As indicated above, the stainless steel fibers used in accordance with the present invention are pretreated with a water soluble resin, such as polyvinyl alcohol, polyvinyl pyrolidone, etc. to provide a thin coating thereon which facilitates the difficult paper manufacturing process utilizing such stainless steel fibers. During the paper making operation, the water soluble polymer at least partially washes from the surface of the metallic fibers and acts as a dispersant.

The following examples are offered to illustrate the present invention.

EXAMPLE I

Stainless steel fibers having a fiber diameter of about 8 μm in lengths of $\frac{1}{4}$, $\frac{1}{2}$ and $\frac{3}{4}$ inches, pre-treated with polyvinyl alcohol to prevent damage to the brittle fibers during the paper making process, were purchased from Memtec America Corporation of DeLand, Fla. The stainless steel concentration levels used were 1.5% and 5% based on total dry paper solids. Several sheets of paper containing these stainless steel fibers were made by hand and were then cut into 6 inch by 6 inch sheets and hand-dipped in isopropyl alcohol thinned aqueous phenolic resin. The stainless steel fiber containing sheets were tested and compared to carbon particle paper treated in phenolic resin which can also be used as a conductive paper layer in static dissipative laminates as per Ungar et al U.S. Pat. No. 4,784,908.

The core paper with stainless steel fibers exhibited comparable electrical characteristics to the carbon particles containing core paper which is a known effective core conductive layer for static dissipative laminates.

EXAMPLE II

Using the same process of Example I, a production run stainless steel fiber containing core paper was made. Several rolls of paper were made. The paper was cut into 4 by 4 inch samples, tested and compared to carbon fiber paper as used in O'Dell et al Ser. No. 07/624,442, produced on two separate dates. Electrical properties were comparable.

Additional samples were taken from the same reels, cut into 6 by 6 inch samples and hand dipped in phenolic resin. The sheets were pressed into static dissipative high pressure laminates made of one sheet of decor paper 12, one sheet of stainless steel containing paper and three sheets of kraft paper 16. The samples were pressed to a peak temperature of 280° F. These laminates were then tested. See Tables I and II for results.

TABLE I

| Sample Thickness Inches | Ash[1] | % Resin Content Solids | % Volatile Remaining After Curing |
|---|---|---|---|
| 1. 0.047 | 6.7 | 36.2 | 7.4 |
| 2. 0.045 | 6.7 | 41.8 | 9.3 |
| 3. 0.048 | 6.6 | 31.5 | 7.3 |
| 4. 0.044 | 3.1 | 31.4 | 9.6 |

[1]Ash is the weight after burning off the paper and reflects the weight of stainless steel in the laminate.

TABLE II

| | Electrical Tests | | | | | |
|---|---|---|---|---|---|---|
| Sample | Surface[1] 100 | Volume[2] 100 | Surf PP[3] 100 | Grd[4] 100 | P-P[5] 100 | F |
| Relative Humidity 50% | | | | | | |
| 1. | $2 \times 10^8$ | $1 \times 10^7$ | $4 \times 10^7$ | $7 \times 10^6$ | 2000 | 44.6 |
| 2. | $4 \times 10^8$ | $1 \times 10^7$ | $5 \times 10^7$ | $2 \times 10^7$ | 2000 | 78.3 |
| 3. | $3 \times 10^8$ | $2 \times 10^7$ | $3 \times 10^7$ | $6 \times 10^6$ | 2000 | 38.6 |
| 4. | $2 \times 10^8$ | $1 \times 10^7$ | $3 \times 10^7$ | $3.5 \times 10^6$ | 2000 | 1785 |
| Relative Humidity 10% | | | | | | |
| 1. | $3 \times 10^{10}$ | $1 \times 10^{10}$ | $3 \times 10^{10}$ | $2 \times 10^{10}$ | 2000 | 53.3 |
| 2. | $3 \times 10^{10}$ | $3 \times 10^{10}$ | $4 \times 10^{10}$ | $3 \times 10^{10}$ | 2000 | 62.7 |
| 3. | $5 \times 10^{10}$ | $1 \times 10^{10}$ | $5 \times 10^{10}$ | $2 \times 10^{10}$ | 1000 | 30.1 |
| 4. | $5 \times 10^{10}$ | $3 \times 10^{10}$ | $3 \times 10^{10}$ | $1 \times 10^{10}$ | 2000 | 284.4 |

[1]Surface resistivity is in ohms/square at 100 V.
[2]Volume resistance is in ohms at 100 V.
[3]Surface resistance point to point is in ohms.
[4]Resistance to ground is in ohms at 100 V.
[5]Grounded point to point is in ohms at 100 V and low voltage (F), less than 2 ohms.

This embodiment of the present invention exhibits excellent static dissipative elaminate characteristics.

EXAMPLE III

Several rolls of stainless steel paper were produced according to the process of Example II. These were run through a mechanical impregnator using phenolic resin. The target resin content was 35% and volatile content was 6%.

Rolls 1, 3 and 5 were tested. See Tables III and IV for results.

TABLE III

| | Parameters of Paper Production and Treater Run | | | | | |
|---|---|---|---|---|---|---|
| Roll No. | Basis Wet[1] | Weight Dry[2] | Resin Content | Volatile Content | End of Run Disk Wt.[3] | #/rm[4] | Ash Content[5] |
| 1. | 152 | 115 | 33 | 7.2 | 156 | 118.5 | 10.0 |
| 3. | 189 | 137 | 30.5 | 4.7 | 134 | 101.3 | 7.2 |
| 5. | 115 | 87 | 33.5 | 8.9 | 129.7 | 98.3 | 9.2 |

[1] Basis weight of the roll after manufacture, before treater in pounds per ream.
[2] Basis weight after drying.
[3] Basis weight measured on treater.
[4] Basis weight converted to pounds per ream.
[5] Ash content was determined on the end of the rolls.

The production pressed and treated samples from each roll were pressed into static dissipative laminates and the electrical parameters were tested. The laminates were made of one sheet of decor paper 12, one sheet of stainless steel-containing paper 14 and three sheets of unmodified kraft paper 16. See Table IV for results.

TABLE IV

| Sample | Surface[1] 100 | Volume[2] 100 | Surf PP[3] 100 | Grd[4] 100 | P-P[5] 100 | F |
|---|---|---|---|---|---|---|
| 1. | $6 \times 10^8$ | $7 \times 10^7$ | $2 \times 10^8$ | $1 \times 10^7$ | 1000 | 38.3 |
| 3. | $6 \times 10^8$ | $1 \times 10^8$ | $3 \times 10^8$ | $4 \times 10^7$ | 1000 | 83.5 |
| 5. | $5 \times 10^8$ | $7 \times 10^7$ | $4 \times 10^8$ | $4 \times 10^7$ | 1000 | 50.5 |

[1] Surface resistivity is in ohms/square at 100 V.
[2] Volume resistance is in ohms at 100 V.
[3] Surface resistance point to point is in ohms.
[4] Resistance to ground is in ohms at 100 V.
[5] Grounded point to point is in ohms at 100 V and low voltage (F), less than 2 ohms.

Sample 5 was further tested by a detailed point to point testing for hot spots and found to be uniform across the sheet.

Sample 3 was further tested for moisture absorption and center swell and found to be acceptable. Sample 3 was exposed to conductive heat, hot water, hot wax, light and stain which were found to have no effect. The sample was tested for resistance to abrasion for rate of wear per 100 cycles at 500 cycles and found to stand up to wear. The sample was tested for warping at low and high humidity and found to be normal. The sample is impact resistant to a ball dropped from 53 inches. The sample is resistant to a radiant heat source for 194 seconds before blistering. When tested for dimensional change the sample was found to have a machine direction change of 0.12% and a cross directional change of 0.75%, both of which are acceptable.

The present embodiment of the invention is an effective static dissipative laminate which also has good abrasion, stain, impact, warp, cigarette and blister resistance and light stability.

EXAMPLE IV

Several sheets of paper containing stainless steel fiber were made by hand as described in Example I. The fiber length used was ¼ inch. The percentages of stainless steel fiber concentrations in the paper were varied. The electrical parameters of the sheets were tested. See Table V for the results.

TABLE V

| Sample ID | % Target | Weight in Sample Actual | Surface 100 V[1] | Volume 100 V[2] |
|---|---|---|---|---|
| 1. | 2 | 1.98 | $1 \times 10^9$ | $9 \times 10^7$ to $10^8$ |
| 2. | 3 | 3.02 | $3 \times 10^8$ | 50,000 to $10^7$ |
| 3. | 4 | 3.92 | 10,000 | 12,000 |
| 4. | 5 | 4.87 | 8,000 | 10,000 |

[1] Surface resistivity is in ohms/square at 100 V.
[2] Volume resistance is in ohms at 100 V.

The paper samples were saturated in 1000 mls of aqueous phenolic resin and 330 mls of isopropyl alcohol. The resin content was determined to be 26.4, 25.6, 27.0 and 33.5% for samples 1, 2, 3 and 4 respectively.

Static dissipative laminates were laid up and pressed at 265° F. The laminates were tested for their electrical parameters. See Table VI for the results.

TABLE VI

| Sample 50% RH[5] | Surface[1] 100 | Volume[2] 100 | Grd[3] 100 | P-P[4] 100 | F |
|---|---|---|---|---|---|
| 1. | $5 \times 10^9$ | $2 \times 10^8$ | $1 \times 10^8$ | $6 \times 10^7$ | — |
| 2. | $5 \times 10^9$ | $2 \times 10^8$ | $5 \times 10^7$ | — | 362 |
| 3. | $5 \times 10^9$ | $1 \times 10^8$ | $3 \times 10^7$ | — | 94.8 |
| 4. | $5 \times 10^9$ | $1 \times 10^8$ | $3 \times 10^7$ | — | 365 |
| Sample 15% RH[5] | Surface[1] 100 | Volume[2] 100 | Grd[3] 100 | P-P[4] 100 | F |
| 1. | $10^{11}$ | $10^{10}$ | $10^{10}$ | $9 \times 10^7$ | — |
| 2. | $10^{11}$ | $10^{10}$ | $10^{10}$ | 2000 | 286.9 |
| 3. | $10^{11}$ | $10^{10}$ | $10^{10}$ | 2000 | 85.9 |
| 4. | $10^{11}$ | $10^{10}$ | $10^{10}$ | 2000 | 2020 |

[1] Surface resistivity is in ohms/square at 100 V.
[2] Volume resistance is in ohms at 100 V.
[3] Resistance to ground is in ohms at 100 V.
[4] Grounded point to point is in ohms at 100 V and low voltage (F), less than 2 ohms.
[5] RH is relative humidity.

The grounded point to point test is the most sensitive measure of resistance and indicates that laminates with a stainless steel content as low as three percent prove to be quite effective as static dissipative laminates, giving a preferable range of three to five percent by weight based on the paper weight.

EXAMPLE V

Stainless steel fiber paper was made according to Example III, cut into 4 by 8 foot sheets and pressed into laminate comprised, from the top down, of one decor sheet 12, one sheet of stainless steel fiber-containing paper 14, three sheets of unrefined kraft paper, one further sheet of stainless steel fiber-containing paper and 2 sheets of thin overlay paper. The electrical parameters of the laminate were tested. See Table VII for the results.

TABLE VII

| Surface[1] 100 | Volume[1] 100 | Grd[3] 100 | P-P[4] 100 | F |
|---|---|---|---|---|
| $5 \times 10^8$ | $5 \times 10^9$ | $3 \times 10^7$ | 0 | 21.8 |

[1] Surface resistivity is in ohms/square at 100 V.
[2] Volume resistance is in ohms at 100 V.
[3] Resistance to ground is in ohms at 100 V.
[4] Grounded point to point is in ohms at 100 V and low voltage (F), less than 2 ohms.

The total thickness of the laminates ranged from 0.062 to 0.063 inches. This embodiment is also an effective form of the present invention.

The foregoing description of the specific embodiments will so fully reveal the general nature of the invention that others can, by applying current knowledge, readily modify and/or adapt such specific embodiments without departing from the generic concept, and therefore such adaptations and modifications should and are intended to be comprehended within the meaning and range of equivalents of the disclosed embodiments. It is to be understood that the phraseology or terminology employed herein is for purposes of description and not of limitation.

What is claimed is:

1. In a decorative, static dissipative, high pressure laminate having a surface resistivity on the order of $10^6$ to $10^9$ ohms/square at a relative humidity of about 50% and having a plurality of consolidated thermosetting resin impregnated layers including a plural-layer core and a decor surface layer, the improvement wherein:

said core comprises at least one thermoset resin impregnated paper core sheet and, provided together with said at least one paper core sheet, at least one special aqueous thermosetting resin impregnated core sheet of predominantly paper fibers and about 1.5 to 15 wt % of stainless steel fibers having a length of ¼ to ¾ inches randomly distributed among said paper fibers, said stainless steel being selected from stainless steels containing on the order of 10% or more of Ni and sufficiently resistant to corrosion to remain conductive after having been subjected to paper making from an aqueous slurry and after lamination in the presence of aqueous thermosetting resin at a temperature of at least 230° F.

2. The laminate according to claim 1 wherein said stainless steel fibers are selected from stainless steel fibers having been pre-coated with a water soluble polymer.

3. The laminate according to claim 2 wherein said water soluble polymer is polyvinyl alcohol.

4. The laminate according to claim 1 wherein said stainless steel fibers are 300 series stainless steels.

5. The laminate according to claim 1 wherein said stainless steel fibers comprise between 3 and 5.5% by weight of said special core sheet based on the total fiber weight.

6. The laminate according to claim 1 having a surface resistance of no more than $10^{11}$ at a relative humidity of 15%.

7. In a static dissipative, high pressure laminate comprising a plurality of consolidated layers having effectively zero volt charge after two seconds at 17% or lower relative humidity, and a decor layer above said core layers, said decor layer being impregnated with a thermosetting resin and an amount sufficient of glycerin or an aliphatic tertiary amine together with an ionic salt to provide a surface resistivity on the order of $10^6$ to $10^9$ ohms/square at a relative humidity of about 50%, the improvement wherein:

said core comprises at least one non-conductive core layer topped with a special core layer comprising about 1.5 to 15% by weight of stainless steel fibers having a length of ¼ to ¾ inches randomly distributed therein, said stainless steel being selected from stainless steels sufficiently resistant to corrosion to remain conductive after having been subjected to paper making from an aqueous slurry and after lamination in the presence of aqueous thermosetting resin at a temperature of at least 230° F. and a pressure of at least 300 psi, said stainless steel fibers having been precoated with a water soluble polymer prior to said paper making.

8. A laminate according to claim 7 wherein said stainless steel fibers constitute 3–5.5% by weight of said special core sheet, based on the total fiber weight.

* * * * *